United States Patent [19]
Bruson et al.

[11] 3,865,793
[45] Feb. 11, 1975

[54] POLYHYDROXY COMPOSITIONS

[75] Inventors: Herman A. Bruson, Woodbridge, Conn.; Henry Gould, Englishtown, N.J.

[73] Assignee: Milchem Incorporated, Houston, Tex.

[22] Filed: Mar. 9, 1973

[21] Appl. No.: 339,604

[52] U.S. Cl............ 260/78.5 R, 252/89, 252/313 R, 260/78.5 T
[51] Int. Cl........................ C08f 15/36, C08f 27/04
[58] Field of Search ............................... 260/78.5 R

[56] References Cited
UNITED STATES PATENTS
3,557,065   1/1971   Blumberg et al. ................ 260/78.4

*Primary Examiner*—Joseph L. Schofer
*Assistant Examiner*—John Kight
*Attorney, Agent, or Firm*—William C. Norvell, Jr.

[57] ABSTRACT

A composition of matter consisting of the mono-allyl ester of a carboxylic acid selected from the class consisting of maleic and fumaric acid copolymerized in a 1-to-1 mole ratio with a member selected from the class consisting of fumaric acid and maleic anhydride. The composition possesses a high capacity for chelating alkaline earth metal ions in aqueous solutions and has been found to be useful as a detergent builder and dispersant of clayey materials.

5 Claims, No Drawings

POLYHYDROXY COMPOSITIONS

BACKGROUND OF THE INVENTION

1. Field of the Invention

The invention relates to a new composition of matter and its use as a chelate, detergent builder and dispersant.

2. Description of the Prior Art

Homo polymers of maleic anhydride as well as copolymers of maleic anhydride with vinyl ethers, vinyl esters and other olefins such as isobutylene are known to possess pigment suspending and dispersing properties. The prior art has also utilized homo polymers of maleic anhydride as detergent builders.

The broad concept of "built" detergent compositions has been known for some time and encompasses the capability possessed by certain substances of substantially improving the effectiveness of detergent compounds. The improved or enhanced result as evidenced by a washed article appearing cleaner and brigther is generally characterized as the "builder" effect. Compounds which perform in this manner are called builders. The improved performance attributed to the builder is manifested in a variety of ways. Among the ways with respect to which builders are thought to have useful effects are such factors as stabilization of suspended solid soils, emulsification of soils, the surface activity in an aqueous detergent solution, the solubilization of water-insoluble materials, foaming or suds producing characteristics of the washing solutions, peptization of soil agglomerates, neutralization of acid soils and the like, in addition to the sequestration of mineral constituents present in the washing solution. The term "detergent" is used in a general sense and is intended to embrace both cleaning and whiteness maintenance properties. Built detergent compositions prepared specifically for laundering the wide range of natural and synethetic fabrics commonly in use today are termed "heavy-duty" detergents. Such compositions rely for their effectiveness, in part, on a relatively high proportion of builder materials being present in the composition.

The nature of the building action, while quite widely recognized in the literature is not completely understood. There does appear to be some connection between the ability of a builder to soften water which is used to make up the washing solution and the improved result in detergency obtained when the builder is used. However, not all materials which act to sequester hardness-imparting calcium and magnesium ions perform satisfactorily as builders. No general basis has been found or is known either as regards physical properties or in chemical structure upon which one can predict with any degree of accuracy the performance of chemicals as detergent builders. Further, useful building actions with the most effective builders can be noted both above and below the point at which the builder is present in the washing solution in stoichiometric proportions to the hardness in water.

Building effects in detergents have been noted in connection with various inorganic alkaline salts such as alkali metal carbonates, bicarbonates, phosphates, polyphosphates and silicates. Similar building properties have also been noted in connection with certain organic salts such as alkali metal, sodium and potassium ethylenediaminetetraacetate, sodium and potassium N-(2-hydroxyethyl)-ethylenediaminetriacetate, sodium and potassium nitrilotriacetate. Alkali metal salts of phytic acid have also been utilized to some degree as organic builders in detergent formulations.

In recent years, the detergent industry has become concerned about water pollution caused by phosphates. The use of these builders is being discouraged or prohibited by law in order to curtail the growth of algae in rivers, lakes and streams where the residues from household and industrial detergents can collect, causing ecological damage by maintaining an active growth of algae that normally require phosphate ions for metabolism and survival.

In accordance with the present invention, it has been discovered that the mono-allyl esters of maleic and fumaric acid readily copolymerize with maleic anhydride and fumaric acid to yield an alternating 1:1 copolymer. The water soluble salts of these new copolymers particularly possess a high capacity for chelating alkaline earth metal ions in aqueous solution, and especially, calcium ions. For example, the chelating compositions of this invention, in the form of the dried, water-soluble sodium or potassium salt of the hydrolyzed lactones, can be added as dry detergent builders to powdered or flaked soap formulations in lieu of, or as partial replacements for, phosphate builders. Alternatively the aqueous alkali metal salt solutions of the hydrolyzed lactones can be mixed with aqueous detergent solutions or slurries and the mixture spray dried or by other means known to those skilled in the art. For this purpose, from about 5 percent to about 50 percent by weight of these chelates based on the weight of the detergent have been found to be quite effective as builders.

It is therefore an object of the present invention to provide a new composition of matter.

It is also an object of the present invention to provide a new and improved class of detergent builder materials.

It is a further object of the present invention to provide a new alkaline earth metal chelate.

Other objects and advantages of the present invention will be readily apparent to those skilled in the art from a reading of the specification and claims which follow.

The invention relates to a composition of matter consisting of monoallyl esters of a carboxylic acid selected from the class consisting of maleic and fumaric acid copolymerized in a 1-to-1 mole ratio with a member selected from the class consisting of fumaric acid and maleic anhydride. The composition possesses a high capacity for chelating alkaline earth metal ions in aqueous solutions and has been found to be useful as a detergent builder and dispersant of clayey materials.

DESCRIPTION OF THE PREFERRED EMBODIMENTS

Although not fully understood, it is believed that essentially all of the mono-allyl ester copolymerizes with maleic anhydride or fumaric acid by a cyclic mechanism to give copolymer (1) as follows:

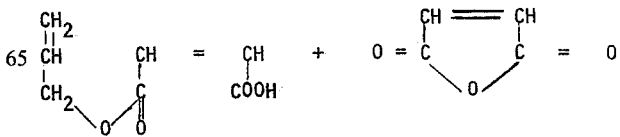

(1)

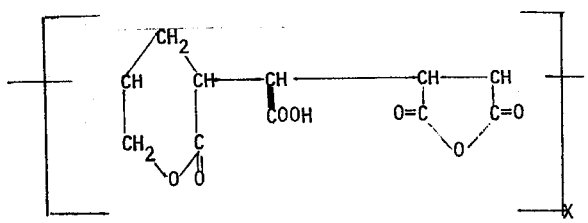

where X is a positive integer greater than one. Upon heating copolymer (1) with aqueous sodium hydroxide, the lactone ring and the anhydride group are opened to form the sodium salt of the polymeric hydroxy acid (2). This material is as follows:

(2)

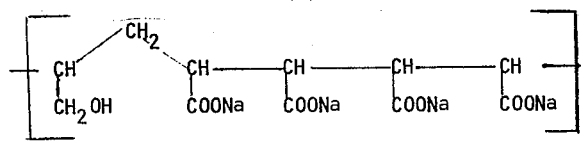

wherein X is a positive integer greater than one.

The copolymerization of mono-allyl maleate or mono-allyl fumarate with either maleic anhydride or fumaric acid takes place readily at temperatures from about 50°C to 150°C. Preferably, the reaction is conducted at a temperature range of from between about 85°C to about 100°C. Free radical catalysts such as hydrogen peroxide, ozonides, and organic peroxides such as benzoyl peroxide or lauroyl peroxide, and hydroperoxides such as tertiary butyl hydroperoxide and azo-bis-(isobutyronitrile) may be used for this purpose. The two monomers are preferably copolymerized in an inert organic liquid which is a solvent for the reactants but a non-solvent for the copolymer. In this manner, the resulting copolymer precipitates from the solution as a fine white powder. For the purpose, benzene, chlorobenzene, ethylene dichloride, xylene, tetrachloroethane and other inert solvents can be used.

The invention is further illustrated by the following examples:

EXAMPLE I

A one liter reaction flask was fitted with a thermometer, reflux condenser, stirrer and gas sparge tube. 80 gm of maleic anhydride (.816 mole), 125 gm of mono allyl maleate (.8 mole) and 250 gm of ethylene dichloride were charged to the flask and resulting solution heated with stirring to 90°C. Stirring and a slow stream of nitrogen bubbles were maintained throughout the heating period and subsequent reaction. A solution of 10 gm of benzoyl peroxide in 50 gm of ethylene dichloride was added over a four hour period, during which time the reaction mixture was maintained at reflux. Initially the reaction refluxed at 95°C and terminally at 87°C. Immediate turbidity was noted when the catalyst solution (benzoyl peroxide) was added and a heavy precipitate formed as the reaction continued. Heating and reflux were continued for 2 hours after the benzoyl peroxide catalyst had been added. The reaction mix was then cooled to room temperature and vacuum filtered. The voluminous white cake was washed on the filter funnel with 200 gm. of ethylene dichloride and dried. The resulting powdery dry white polymer weighed 169 gm (82.5 percent of the charged monomers).

74.5 gm of the dry powder obtained above was slurried in 212 gm of deionized water and then heated to 70°–80°C. Sodium hydroxide (50 percent solution) was added gradually, until the pH of the solution was over 10. The polymer went into solution slowly as the caustic soda was added. The batch was then heated to reflux (about 105°C) and held one-half hour to complete hydrolysis. Incremental sodium hydroxide was added during this period to maintain the pH at about 11–12. 77.5 gm of 50 percent sodium hydroxide were used. The resulting solution contained about 28% solids as the sodium salt.

EXAMPLE II 49 gm (0.5 mole) of maleic anhydride, 156 gm. (1 mole) mono allyl maleate and 300 gm of ethylene dichloride were charged to the reaction flask. A solution of 10 gm. of (azo bisisobutyronitrile) in 55 gm of ethylene dichloride was added over a 2-hour period at reflux. The batch was then aged 2 hours at reflux. Nitrogen bubbles and conditions were essentially as described in Example I. The batch was cooled, filtered, washed and dried as described in Example I. 172 gm. (87 percent of charged monomers) of dry, white powdery polymer was obtained.

75 gm of the polymer isolated above was hydrolyzed as described in Example I using 250 gm of the deionized water and 85 gm of a 50 percent caustic soda solution. 405 gm of solution was obtained, about 23 percent solids as polymer sodium salt.

In the same way, the potassium salt was obtained by using 114.8 gm of a 50 percent potassium hydroxide solution.

EXAMPLE III

Example II was repeated using as catalyst a solution of 10 gm of benzoyl peroxide in 50 gm of ethylene dichloride. Conditions were maintained as in Example II and the polymer synethesized in the same manner. 186 gm of dry white powdery polymer was isolated (90.5 percent on monomers).

75 gm of the polymer was hydrolyzed using 250 gm of deionized water and 80 gm. of 50 percent caustic soda solution. 405 gm of solution was obtained containing 23 percent solids as sodium salt polymer.

EXAMPLE IV 109 gm of mono allyl maleate, 68.5 gm maleic anhydride and 250 gm of propylene dichloride were charged to a reaction flask. A catalyst solution consisting of 8 gm of benzoyl peroxide dissolved in 60 gm of propylene dichloride was added over a 3 hour period at reflux (95°–100°C). Heating was continued for an additional 3½ hours at reflux with the usual nitrogen blanket throughout the reaction. The batch was processed by cooling, filtering and washing the cake with propylene dichloride. The yield was 147 gm, (84 percent of the monomer charge) of dry powder.

60 gm of the above powder was hydrolyzed as in Example I with 200 gm of water and 61.5 gm 50 percent caustic soda and gave 306 gm of a solution having approximately 24.5 percent solids as sodium salt of the polymers.

EXAMPLE V 69 gm maleic anhydride, 104.5 gm mono allyl maleate and 450 gm of xylene were charged to the standard reactor. The batch was maintained at 135°C ± 5°C and 4 gm di-tertiary-butyl peroxide was added. Two further catalyst additions of 1.7 gms each were made at 1½-hour intervals and the reaction maintained 2½ hours at reflux after catalyst addition. Nitrogen bubbling was maintained throughout. The reaction was cooled, filtered, and the insoluble polymer cake worked on the filter with 190 gm of xylene. 167 gm of dry powder was obtained which was calculated to be about 96.5 percent of the charged monomer.

60 gm of the above powder was hydrolyzed in the usual manner. 59 gm of 50 percent caustic soda was used and the resulting 304 gm solution contained about 25 percent solids as the sodium salt.

EXAMPLE VI 156 gm mono allyl maleate and 450 gm xylene were charged to the reactor. 3 ml. of di-tertiary-butyl peroxide were added at 135°C, followed by two tertiary 2 ml catalyst additions at 2-hour intervals, while the temperature was maintained mostly at reflux at 135°C, with the usual nitrogen blanket. The batch was then aged 2 hours at reflux and worked up in the usual manner to yield 142 gm polymer (90 percent).

60 gm of polymer were hydrolyzed in the presence of water and 59 gm of 50 percent caustic were used to obtain an alkaline pH. 302 gm of solution resulted in about 25 percent solids as polymer sodium salt.

EXAMPLE VII 78.5 gm. (.8 mole) maleic anhydride and 125 gm (.8 mole) mono allyl maleate were charged to a reaction flask along with 350 gm of benzene. With the usual nitrogen stream throughout, the batch was heated to reflux (85°C). 8.5 gm benzoyl peroxide was added and reflux was maintained for 4 hours. 2.2 gm benzoyl peroxide were then added and reflux maintained for an additional 2½ hours. The batch was washed and suction filtered. The cake was washed with 200 gm of benzene and dried. The dry polymer weighed 196 gm., 97 percent of monomer wt.

60 gm of the above dry polymer was hydrolyzed in the usual manner and required 63 gm of 50 percent sodium hydroxide. The resulting solution weighed 315 gm, approximately 24 percent solids as sodium salt.

EXAMPLE VIII 118 gm of maleic anhydride (1.2 mols) 93.5 gm mono allyl maleate (.6 mols) and 350 gm benzene were reacted as in Example VII. 8.5 gm benzoyl peroxide was added and refluxed for 4 hours. An additional 2.2 gm of benzoyl peroxide was added and reflux continued (85°C) for 2½ hours. The batch was prepared in the usual manner and yielded 172.7 gm dry polymer 84.8 percent based on monomers.

60 gms of polymer were hydrolyzed with 200 gm of water and 68.9 gms of 50 percent caustic soda. The resulting solution weighed 328 gm and contained about 24 percent solids as sodium salt.

EXAMPLE IX 58 gm (.5mole) fumaric acid and 78 gm (.5 mole) mono allyl maleate were charged to a standard, stirred reactor with nitrogen throughout together with 250 gm dimethylformamide. 4 gm of benzoyl peroxide was added at 95°C and the temperature maintained 4 hours at 95°–100°C. No precipitate or turbidity was noticed even upon cooling and holding at 20°C for several hours. The batch was concentrated to two-thirds volume where substantial solids were noted. The solids were filtered, washed with DMF and dried. 55 gm of material as dry solids was obtained. The batch mother liquor and wash were stripped to a terminal temperature of 130°C and 5 mm pressure. The residue weighed 75.7 gm.

The dry solids isolated above were hydrolyzed. 30 gm was used and gave 130 gm of a 27 percent solids material. The residue 30 gm was hydrolyzed and also gave 130 gm of a 27 percent solution.

EXAMPLE X 78 gm mono allyl fumarate and 49 gm of maleic anhydride were charged along with 250 gm of benzene. The reaction refluxed 4 hours with 3.5 gm benzoyl peroxide (85°C) and 2 additional hours with 1.5 gm benzoyl peroxide. The batch had the usual nitrogen blanket throughout. The usual turbidity and precipitate were noted. The yield, after cooling, filtering washing and drying, was 127 gm (100 percent) of white powder polymer.

A 60 gm portion of above polymer was hydrolyzed in the usual manner. 270 gm of a solution containing 27 gm solids was obtained.

EXAMPLE XI

Standard Tergotometer tests were made to determine the soil removal effectiveness of a representative laundry detergent composition containing a control formulation and 10 percent of the materials of the present invention in similar formulations. This test is one commonly used in the industry and is detailed in "Proposed Method for Measuring Soil Removal and Whiteness Retention of Fabrics", published by the American Society for Testing and Materials, February, 1969. This method provides a means of measuring the ability of detergents to remove artificial soil from fabric and prevent its redeposition on clean fabric. A laboratory-scale agitator-type washing machine is utilized, together with a reflectometer which is calibrated by means of standard vitreous enamel plaques having reflectance in the range of the fabric sample being measured. The washer is operated at a suitable fixed speed which is recorded with test results. After washing, the sample material is damp dried between clean toweling and then ironed flat between two pieces of clean white cotton sheeting. The reflectance readings are then determined. The test builders of the present invention were samples made as in the indicated Example. The detergent compositions were as follows:

|  | Control (% by wt.) | Test Formula (% by wt.) |
|---|---|---|
| Polyhydroxy builder | — | 20% |
| Carboxymethyl cellulose | 1.0 | 1.0 |
| Sodium silicate | 7.0 | 7.0 |
| Sodium sulfate | 36.0 | 56.0 |
| Linear sodium alkylaryl sulfonate | 16.0 | 16.0 |
| Sodium Tri-Polyphosphate | 40.0 | none |

Each sample was tested at a dilution of 0.25 percent in water having a hardness rating of 15 grains per gallon. Detergency was measured as the increase in diffuse reflectance accomplished after the laundering of the following three different soiled cloths:
1. Test fabric soiled cotton, wash and wear finish
2. ACH 115 soiled cotton*
3. U.S. Testing Soiled Cotton

*Supplied by ACH Fabric Service, Inc., Boston, Mass.

The calculation of the improvement in reflectance was made as follows:

Percent improvement in reflectance = $(A-B)/(C-B) \times 100$ where:
- A = average reflectance of 16 soiled swatches after washing
- B = average reflectance of 16 soiled swatches before washing, and
- C = average reflectance of 4 unsoiled swatches before washing.

To assure the presence of the correct amount of each formula ingredient in the wash solution, dilute aqueous solutions of both samples were prepared and added on an aliquot basis to the Tergotometer beaker.

The Tergotometer test was made in accordance with the following test conditions:

| | |
|---|---|
| Amount of solution/vessel | 1 liter |
| Temperature | 125°± 1% |
| Speed of agitation | 150 cycles/minute |
| Water hardness | 15 grains/gallon |
| Concentration of formulated detergent | 0.25% |
| Wash time | 15 minutes |
| Rinse | 2-5 minute cycles |

The results of soil removal tests are as follosw:

Table II

| | Average Increase in Diffuse Reflectance | | | |
|---|---|---|---|---|
| Builder | ACH 115 Cotton | U.S. Testing Cotton | Testing Fabric Cotton | Total Gain |
| Control | 39.8 | 8.3 | 9.6 | 19.2 |
| Polyhydroxy Acid Salt of: | | | | |
| Example I | 37.6 | 6.1 | 8.1 | 17.2 |
| Example III | 37.9 | 6.7 | 9.0 | 17.9 |
| Example IV | 37.5 | 6.3 | 8.9 | 17.6 |
| Example V | 37.7 | 5.7 | 8.0 | 17.1 |

EXAMPLE XII

Tests were run and results were evaluated to determine the ability of the present compositions to reduce the viscosity of clay slurries. A slurry of Georgia Kaolin Company's "Acid Lustia Kaolin" containing 70 percent kaolin in a 30 percent solution of 0.3 percent sodium carbonate was dispersed with 0.1 percent and 0.2 percent concentrations of various preparations of the present invention. Viscosity of the slurries was measured at room temperature with a Fann Viscometer. The results, in the table below are indicated in centipoises:

Table 12

| Example | Concentration | Centipoises |
|---|---|---|
| IV | 0.2 | 33 |
| IV | 0.1 | 33 |
| V | 0.2 | 37 |
| V | 0.1 | 71 |

Although the invention has been described in terms of specified embodiments which are set forth detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. A 1-to-1 mole ratio hydrolyzed copolymer of (a) a member selected from the class consisting of mono-allyl maleate and mono-allyl fumarate and (b) a member selected from the class consisting of maleic anhydride, fumaric acid and maleic acid.

2. The copolymer of claim 1 in the form of a water soluble salt.

3. A 1-to-1 mole ratio copolymer of mono-allyl maleate and maleic anhydride.

4. A detergent builder composition consisting essentially of the copolymer of claim 1 in the form of an alkali metal salt.

5. An alkaline earth metal ion chelate consisting essentially of the copolymer of claim 1.

* * * * *